United States Patent
Iwanami et al.

(10) Patent No.: US 7,399,167 B2
(45) Date of Patent: Jul. 15, 2008

(54) FLUID MACHINE OPERABLE IN BOTH PUMP MODE AND MOTOR MODE AND WASTE HEAT RECOVERING SYSTEM HAVING THE SAME

(75) Inventors: Shigeki Iwanami, Okazaki (JP); Yasushi Yamanaka, Nakashima-gun (JP); Yasushi Suzuki, Chiryu (JP); Atsushi Inaba, Kariya (JP); Hironori Asa, Okazaki (JP); Keiichi Uno, Kariya (JP); Kazuhide Uchida, Hamamatsu (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 695 days.

(21) Appl. No.: 10/764,534

(22) Filed: Jan. 27, 2004

(65) Prior Publication Data
US 2004/0184923 A1    Sep. 23, 2004

(30) Foreign Application Priority Data

| Jan. 28, 2003 | (JP) | ............................. 2003-019139 |
| Jun. 10, 2003 | (JP) | ............................. 2003-165112 |
| Sep. 19, 2003 | (JP) | ............................. 2003-328284 |

(51) Int. Cl.
*F04B 9/14* (2006.01)
*F04B 49/00* (2006.01)

(52) U.S. Cl. ........................ 417/374; 417/310; 417/311; 417/304

(58) Field of Classification Search ................ 417/237, 417/355, 410.5, 374, 310, 311, 302, 304; 62/402; 418/55.1; 290/43; 60/414, 657
See application file for complete search history.

(56) References Cited

U.S. PATENT DOCUMENTS

| 4,840,545 | A  | 6/1989 | Moilanen |
| 6,230,507 | B1 | 5/2001 | Ban et al. |
| 6,234,769 | B1 * | 5/2001 | Sakai et al. ................. 417/374 |
| 6,443,712 | B2 | 9/2002 | Sakai et al. |
| 6,719,538 | B2 | 4/2004 | Ota et al. |
| 6,732,525 | B2 | 5/2004 | Endoh et al. |

FOREIGN PATENT DOCUMENTS

| JP | A-56-072281 | 6/1981 |
| JP | A-63-99464  | 4/1988 |
| JP | U-63-96021  | 6/1988 |
| JP | A-03-124982 | 5/1991 |
| JP | A-07-127583 | 5/1995 |
| JP | B2-2540738  | 7/1996 |
| JP | A-2001-173582 | 6/2001 |
| JP | B2-3356449  | 10/2002 |

OTHER PUBLICATIONS

Koshal, D. (1993). Manufacturing Engineer's Reference Book, Elsevier.☐☐Online version available at:☐☐http://www.knovel.com/knovel2/Toc.jsp?BookID=431&VerticalID=0.*
Chinese Office Action dated Jul. 29, 2005 with its English translation.
Office Action dated Sep. 28, 2007 in corresponding Japanese Patent application No. 2003-019139 (and English translation).

* cited by examiner

*Primary Examiner*—Devon C. Kramer
*Assistant Examiner*—Jessica L Frantz
(74) *Attorney, Agent, or Firm*—Posz Law Group, PLC

(57) ABSTRACT

A check valve is provided to each discharge port, which communicates between a corresponding working chamber and a high pressure chamber in an integrated compressor/expander apparatus. A valve mechanism, which is opened in a motor mode, is provided to communicate between the working chamber and the high pressure chamber.

26 Claims, 10 Drawing Sheets

FLUID MACHINE OPERABLE IN BOTH PUMP MODE AND MOTOR MODE AND WASTE HEAT RECOVERING SYSTEM HAVING THE SAME

CROSS REFERENCE TO RELATED APPLICATION

This application is based on and incorporates herein by reference Japanese Patent Application No. 2003-19139 filed on Jan 28, 2003, Japanese Patent Application No. 2003-165112 filed on Jun. 10, 2003, and Japanese Patent Application No. 2003-328284 filed on Sept. 19, 2003.

BACKGROUND OF THE INVENTION

1. Field of the Invention

The present invention relates to a fluid machine, which is operable in a pump mode for pressurizing and discharging fluid and is also operable in a motor mode for converting fluid pressure exerted at the time of expansion of fluid into kinetic energy and thereafter outputting the kinetic energy as mechanical energy, and also relates to a waste heat recovering system having the same.

2. Description of Related Art

In a previously proposed vapor compression refrigeration system, which has a Rankine cycle, when energy is recovered through the Rankine cycle, a compressor of the vapor compression refrigeration system is used as an expander, as disclosed in, for example, Japanese Patent No. 2540738.

In the compressor, gas, such as gas phase refrigerant, is drawn into a working chamber upon input of external mechanical energy to the compressor and is compressed by reducing a volume of the working chamber, and thereafter the compressed gas is discharged from the compressor. In the expander, high pressure gas is introduced into the working chamber, and the working chamber is expanded by the pressure of the high pressure gas to output, for example, mechanical energy. Thus, when the compressor is used as the expander, a flow direction of refrigerant needs to be reversed.

However, in the invention recited in Japanese Patent No. 2540738, a refrigerant inlet and a refrigerant outlet of the expander (compressor) used at the time of recovering energy are the same as a refrigerant inlet and a refrigerant outlet of the compressor (expander) used at the time of exerting refrigeration capacity in the vapor compression refrigeration system. Thus, the single compressor cannot be used as the expander. As a result, one of the Rankine cycle and the vapor compression refrigeration system cannot be operated properly.

More specifically, in the compressor, the gas is compressed by reducing the volume of the working chamber upon displacement, i.e., movement of a movable member, such as a piston or a movable scroll. Thus, a check valve is provided in a discharge port, which communicates between the working chamber and a high pressure chamber (discharge chamber), to prevent backflow of the gas from the high pressure chamber to the working chamber.

On the other hand, in the expander, the high pressure gas is conducted from the high pressure chamber to the working chamber to displace, i.e., to drive the movable member and thereby to obtain mechanical output. Thus, even in a case where a means for reversing the gas inlet and the gas outlet is provided in the above arrangement, when the compressor is operated as the expander, the high pressure gas cannot be supplied to the working chamber due to the presence of the check valve, which blocks flow of the high pressure gas into the working chamber. As a result, the compressor cannot be used as the expander even if the means for reversing the gas inlet and the gas outlet is provided.

Furthermore, a volume, i.e., a capacitance of the compressor is normally determined at the time of operation of the vapor compression refrigeration system. However, the pressure exerted in the compressor at the time of operation of the Rankine cycle is higher than the pressure exerted in the compressor at the time of operation of the vapor compression refrigeration system. Thus, even when the same weight flow rate of gas is used in both the time of operation of the vapor compression refrigeration system and the time of operation of the Rankine cycle, a volume flow rate of the Rankine cycle is reduced in comparison to a volume flow rate of the vapor compression refrigeration system. As a result, a rotational speed of the compressor used as the expander is reduced, and a degree of leakage of fluid per rotation of the compressor is increased to decrease an efficiency of the expander.

SUMMARY OF THE INVENTION

The present invention addresses the above disadvantages. Thus, it is an objective of the present invention to provide a novel fluid machine, which is operable in a pump mode for pressurizing and discharging fluid and is also operable in a motor mode for converting fluid pressure exerted at the time of expansion of fluid into kinetic energy and thereafter outputting the kinetic energy as mechanical energy. It is another objective of the present invention to provide a fluid machine, which can improve its efficiency at the time of operation in a motor mode. It is a further objective of the present invention to provide a waste heat recovering system having such a fluid machine.

To achieve the objectives of the present invention, there is provided a fluid machine, which is operable in a pump mode for pressurizing fluid and discharging the pressurized fluid from the fluid machine and is also operable in a motor mode for converting fluid pressure of fluid into kinetic energy and thereafter outputting the kinetic energy as mechanical energy. The fluid machine includes a housing, at least one movable member and a valve mechanism. The at least one movable member is received in the housing, and each movable member defines a working chamber having a variable volume in the housing. The valve mechanism opens and closes at least one communication passage arranged in the housing. Each communication passage communicates between the corresponding working chamber and a high pressure chamber. The valve mechanism enables flow of fluid from each working chamber to the high pressure chamber and blocks backflow of fluid from the high pressure chamber to each working chamber at time of operation of the fluid machine in the pump mode. The valve mechanism opens at least one of the at least one communication passage at time of operation of the fluid machine in the motor mode.

Each movable member may be a piston, which increases and decreases the volume of the corresponding working chamber upon reciprocal movement of the piston. In this case, in the pump mode, the valve mechanism communicates between a low pressure part located in the housing and the corresponding working chamber to supply fluid from the low pressure part to the corresponding working chamber while blocking backflow of fluid from the corresponding working chamber to the low pressure part and thereafter communicates between the corresponding working chamber to the high pressure chamber to supply fluid from the corresponding working chamber to the high pressure chamber while preventing backflow of fluid from the high pressure chamber to the corresponding working chamber. In the motor mode, the valve mechanism communicates between the high pressure chamber to the corresponding working chamber to supply fluid from the high pressure chamber to the corresponding working chamber while preventing backflow of fluid from the corresponding working chamber to the high pressure chamber and thereafter communicates between the corresponding working chamber and the low pressure part to supply fluid from the corresponding working chamber to the low pressure part while preventing backflow of fluid from the low pressure part to the corresponding working chamber.

The fluid machine may further include a capacity variable mechanism and a control apparatus. The capacity variable mechanism varies a capacity of each working chamber to vary a volume of fluid, which is expandable in the corresponding working chamber at the time of operation in the motor mode. The control apparatus controls the capacity variable mechanism to vary the capacity.

Furthermore, to achieve the objectives of the present invention, there is provided a waste heat recovering system, which includes the above fluid machine. The waste heat recovering system recovers energy from heated vapor that is heated by waste heat.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings. For ease of understanding, similar elements are numbered with the same numerals throughout the following embodiments.

FIRST EMBODIMENT

Figure 1:
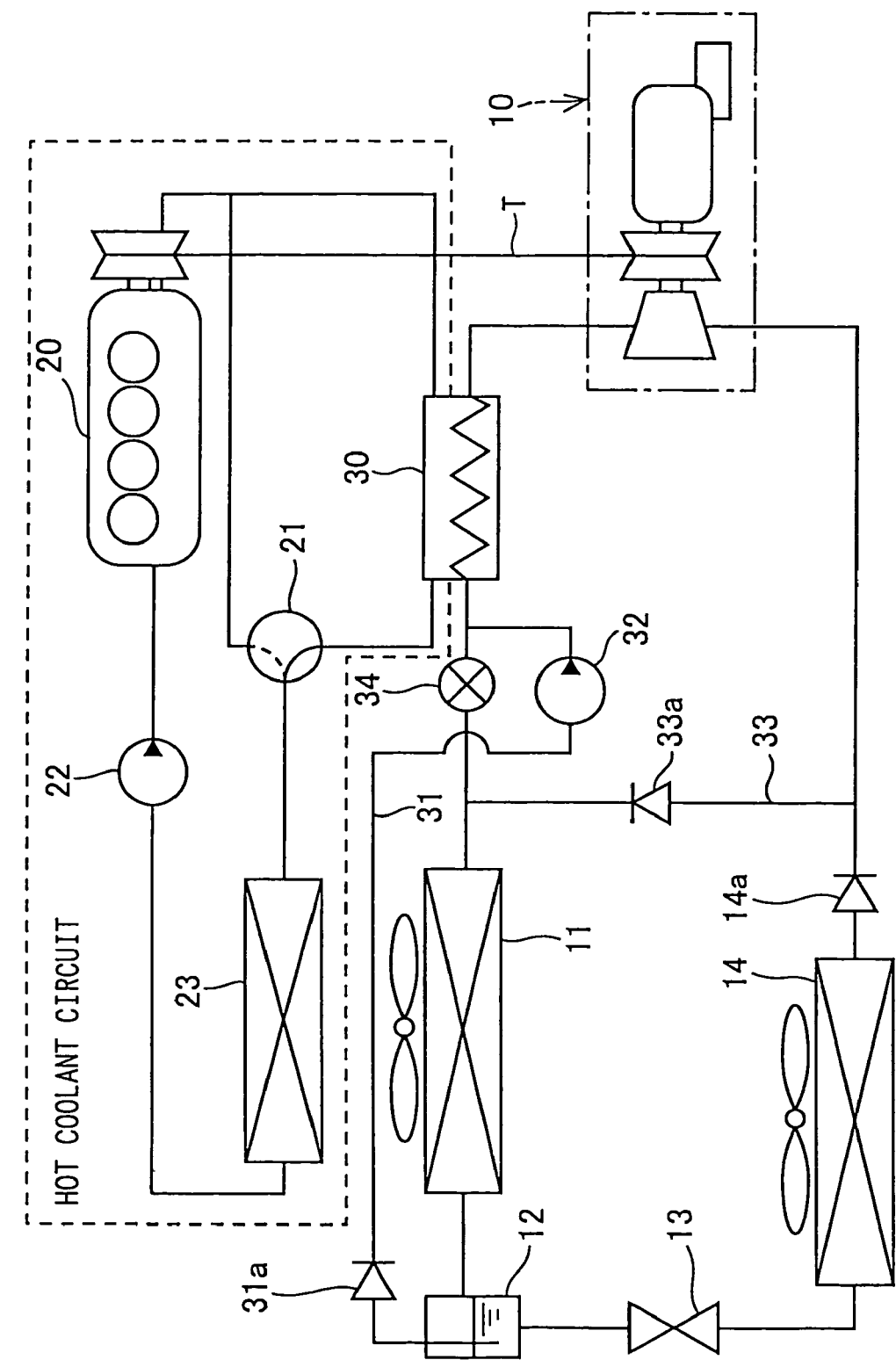
FIG. 1 is a schematic diagram showing a Rankine vapor compression refrigeration system according to a first embodiment of the present invention.

In the present embodiment, a fluid machine of the present invention is applied to a vehicular vapor compression refrigeration system, which includes a Rankine cycle. FIG. 1 is a schematic diagram of the vapor compression refrigeration system of the present embodiment.

The vapor compression refrigeration system of the present embodiment, which includes the Rankine cycle, recovers energy from waste heat generated from an engine 20, which serves as a heat engine that generates drive force for running a vehicle. Furthermore, the vapor compression refrigeration system uses cold energy and hot energy generated therein for air conditioning of the vehicle. The vapor compression refrigeration system, which includes the Rankine cycle, will be described.

An integrated compressor/expander apparatus 10 is a fluid machine that is operable in a pump mode and also in a motor mode. In the pump mode, the integrated compressor/expander apparatus 10 pressurizes gas phase refrigerant and discharges the pressurized refrigerant. In the motor mode, the integrated compressor/expander apparatus 10 converts fluid pressure of superheated vapor refrigerant exerted at the time of expansion of the superheated vapor refrigerant into kinetic energy and outputs the kinetic energy as mechanical energy. A radiator 11 is a heat releasing device that is connected to an output (a high pressure chamber described below) of the integrated compressor/expander apparatus 10 and cools refrigerant while releasing heat. Detail of the integrated compressor/expander apparatus 10 will be described later.

A gas-liquid separator 12 is a receiver that separates the refrigerant, which is discharged from the radiator 11, into gas phase refrigerant and liquid phase refrigerant. A depressurizer 13 depressurizes and expands the liquid phase refrigerant separated in the gas-liquid separator 12. The depressurizer 13 isenthalpically depressurizes the refrigerant. Furthermore, in the present embodiment, the depressurizer 13 is a temperature sensitive expansion valve, which adjusts a degree of its opening in such a manner that a degree of superheat of the refrigerant drawn into the integrated compressor/expander apparatus 10 is held generally at a predetermined value when the integrated compressor/expander apparatus 10 is operated in the pump mode.

An evaporator 14 is a heat absorbing device that vaporizes the depressurized refrigerant, which is depressurized in the depressurizer 13, to absorb heat. The integrated compressor/expander apparatus 10, the radiator 11, the gas-liquid separator 12, the depressurizer 13 and the evaporator 14 form the vapor compression refrigeration system, which transfers heat from a low temperature side to a high temperature side.

A heater 30 is a heat exchanger, which is provided in a refrigerant circuit for connecting between the integrated compressor/expander apparatus 10 and the radiator 11 and heats the refrigerant in the refrigerant circuit through heat exchange between the refrigerant in the refrigerant circuit and engine coolant. A three-way valve 21 is switched between a circulating position and a non-circulating position. In the circulating position of the three-way valve 21, the engine coolant outputted from the engine 20 is circulated to the heater 30. In the non-circulating position of the three-way valve 21, the engine coolant outputted from the engine 20 is not circulated to the heater 30. The three-way valve 21 is controlled by an electronic control device (not shown).

A first bypass circuit 31 is a refrigerant passage that conducts the liquid phase refrigerant separated in the gas-liquid separator 12 to a refrigerant inlet of the heater 30 located on a radiator 11 side of the heater 30. A fluid pump 32 for circulating liquid phase refrigerant and a check valve 31a are provided in the first bypass circuit 31. The check valve 31a allows flow of the refrigerant only in a single direction from the gas-liquid separator 12 to the heater 30. In the present embodiment, the fluid pump 32 is an electric pump and is controlled by the electronic control device (not shown).

A second bypass circuit 33 is a refrigerant passage that connects between a refrigerant inlet of the radiator 11 and a refrigerant outlet (i.e., a low pressure chamber described below) of the integrated compressor/expander apparatus 10, from which the refrigerant is discharged at the time of operating the integrated compressor/expander apparatus 10 in the motor mode. A check valve 33a is provided in the second bypass circuit 33. The check valve 33a allows flow of the refrigerant only in a single direction from the integrated compressor/expander apparatus 10 toward the refrigerant inlet of the radiator 11.

A check valve 14a allows flow of the refrigerant from a refrigerant outlet of the evaporator 14 toward a refrigerant inlet of the integrated compressor/expander apparatus 10, from which the refrigerant is supplied to the integrated compressor/expander apparatus 10 at the time of operating the integrated compressor/expander apparatus 10 in the pump mode. A switching valve 34 is a solenoid valve that opens and closes the refrigerant passage. The switching valve 34 and the three-way valve 21 are controlled by the electronic control device (not shown).

A water pump 22 circulates the engine coolant. A radiator 23 is a heat exchanger that exchanges heat between the engine coolant and outside air to cool the engine coolant. In FIG. 1, a bypass circuit and a flow rate control valve are eliminated for the sake of simplicity. The bypass circuit conducts the coolant while bypassing the radiator 23. The flow rate control valve controls a flow rate of the coolant supplied to the bypass circuit and also a flow rate of the coolant supplied to the radiator 23.

The water pump 22 is a mechanical pump that is driven by drive force transmitted from the engine 20. However, it should be noted that an electric pump driven by an electric motor can be used as the water pump 22 in place of the mechanical pump.

Next, the integrated compressor/expander apparatus 10 of the first embodiment will be described.

Figure 2:
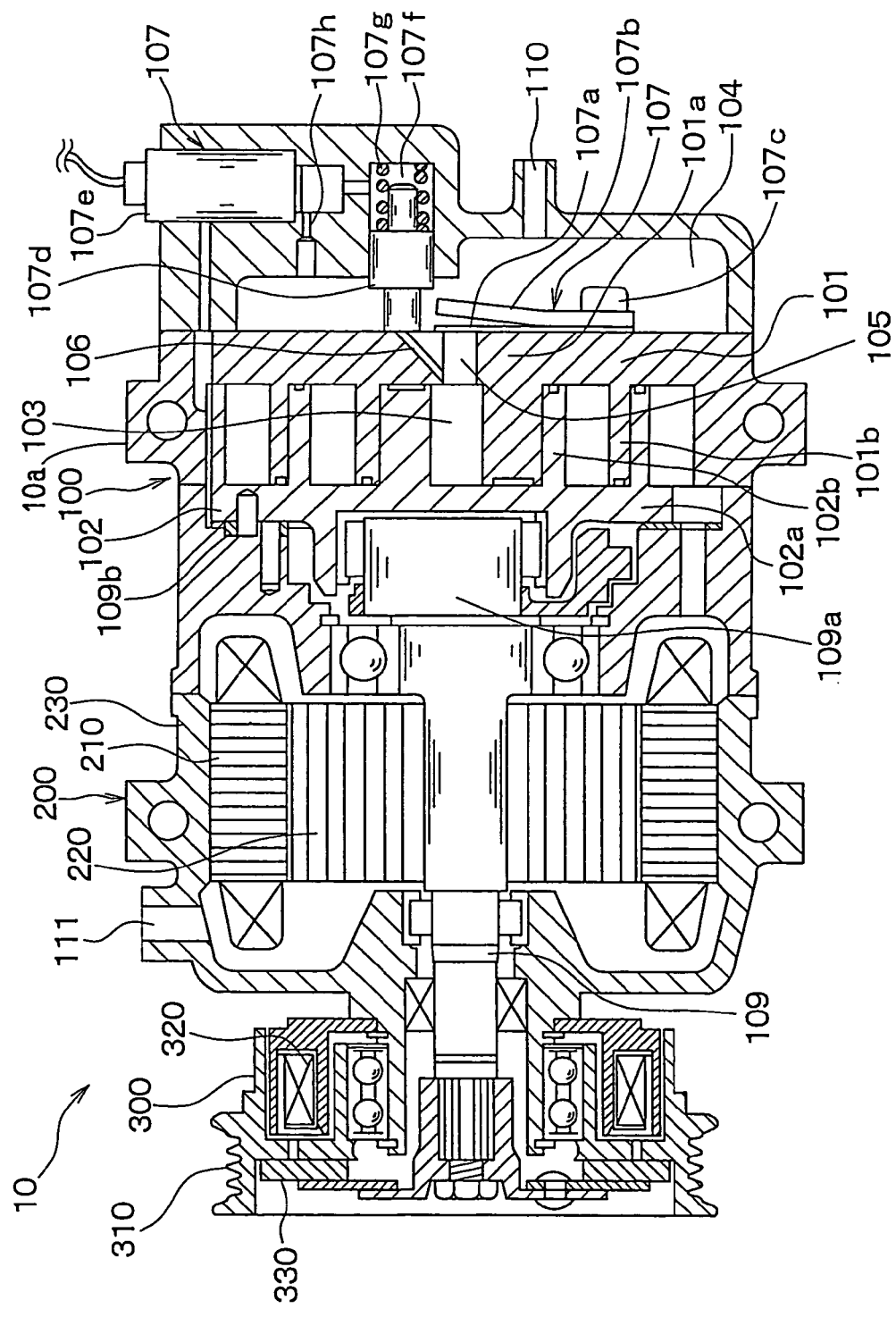
FIG. 2 is a cross sectional view of an integrated compressor/expander apparatus according to the first embodiment of the present invention.

FIG. 2 is a cross sectional view of the integrated compressor/expander apparatus 10. The integrated compressor/expander apparatus 10 includes a housing 10a, a pump motor mechanism 100, a dynamo-electric machine 200 and an electromagnetic clutch 300. The housing 10a receives the pump motor mechanism 100 and the dynamo-electric machine 200. The pump motor mechanism 100 compresses or expands fluid (gas phase refrigerant in this embodiment). The dynamo-electric machine 200 is connected to a shaft 109 of the pump motor mechanism 100. The electromagnetic clutch 300 is a drive force transmission mechanism or arrangement, which enables and disables transmission of drive force from the engine (serving as an external drive source) 20 to the pump motor mechanism 100, more specifically, to the shaft 109 of the pump motor mechanism 100.

The dynamo-electric machine 200 includes a stator 210 and a rotor 220, which is rotated in the stator 210. In the present embodiment, when electric power is supplied to the stator 210, the dynamo-electric machine 200 is operated as an electric motor, which rotates the rotor 220 to drive the pump motor mechanism 100. Furthermore, when torque to rotate the rotor 220 is supplied to the dynamo-electric machine 200, the dynamo-electric machine 200 is operated as a dynamo, which generates electric power.

The electromagnetic clutch 300 includes a pulley 310, an exciting coil 320 and a friction plate 330. The pulley 310 receives the drive force from the engine 20 through a V-belt T (FIG. 1). The exciting coil 320 generates a magnetic field. The friction plate 330 is displaced by electromagnetic force generated by the magnetic field, which is induced by the exciting coil 320. At the time of connecting the electromagnetic clutch 300 to connect between the engine 20 and the integrated compressor/expander apparatus 10, the exciting coil 320 is energized. At the time of disconnecting the electromagnetic clutch 300 to disconnect between the engine 20 and the integrated compressor/expander apparatus 10, the exciting coil 320 is deenergized.

The structure of the pump motor mechanism 100 is substantially the same as that of a known scroll compressor mechanism. More specifically, the pump motor mechanism 100 includes a fixed scroll (shell) 101, an orbiting scroll 102 and a valve mechanism 107. The fixed scroll 101 is indirectly secured to a stator housing 230 of the dynamo-electric machine 200, which is a part of the housing 10a. The orbiting scroll 102 is a movable member, which is displaced, i.e., is revolved in a space defined between the stator housing 230 and the fixed scroll 101. The valve mechanism 107 opens and closes communication passages 105, 106, which communicate between a working chamber 103 and a high pressure chamber 104.

The fixed scroll 101 includes a base plate 101a and a spiral wrap 101b. The spiral wrap 101b of the fixed scroll 101 projects from the base plate 101a toward the stator housing 230. The orbiting scroll 102 includes a spiral wrap 102b and a base plate 102a. The spiral wrap 102b is formed on the base plate 102a. Furthermore, the spiral wrap 102b of the orbiting scroll 102 contacts and engages the spiral wrap 101b of the fixed scroll 101. In the above state where the spiral wrap 101b and the spiral wrap 102b contact with each other, when the orbiting scroll 102 revolves, a volume of the working chamber 103, which is formed by the fixed scroll 101 and the orbiting scroll 102, is reduced.

The shaft 109 also serves as a rotatable shaft of the rotor 220 and is made as a crank shaft, which includes an eccentric portion 109a. The eccentric portion 109a is provided at one longitudinal end of the shaft 109 and is eccentric to a rotational axis of the shaft 109. The orbiting scroll 102 is rotatably connected to the eccentric portion 109a through a bearing. Thus, a rotational axis of the orbiting scroll 102 is coaxial with a rotational axis of the rotor 220 and is also coaxial with a rotational axis of the electromagnetic clutch 300 (i.e., a rotational axis of the shaft 109).

A rotation limiting mechanism 109b is constructed to allow one complete revolution of the orbiting scroll 102 around the eccentric portion 109a per rotation of the shaft 109. Thus, when the shaft 109 is rotated, the orbiting scroll 102 does not rotate but revolves around the rotational axis of the shaft 109. The volume of the working chamber 103 decreases from a radially outer part of the orbiting scroll 102 toward a radially inner part of the orbiting scroll 102.

In the present embodiment, a pin-ring (pin-hole) type mechanism is used as the rotation limiting mechanism 109b.

The communication passage 105 is a discharge port, which communicates between the working chamber 103 of the minimum volume and the high pressure chamber 104 to discharge the compressed refrigerant therethrough at the time of operation in the pump mode. The communication passage 106 is an intake port, which communicates between the high pressure chamber 104 and the working chamber 103 of the minimum volume to conduct hot pressurized refrigerant, i.e., superheated vapor from the high pressure chamber 104 to the working chamber 103 at the time of operation in the motor mode.

The high pressure chamber 104 functions as a discharge chamber, which reduces pressure surge of the refrigerant discharged from the communication passage 105 (hereinafter, referred to as a discharge port 105). The high pressure chamber 104 has a high pressure port 110, which is connected to the heater 30 and the radiator 11.

The low pressure port 111, which is connected to the evaporator 14 and the second bypass circuit 34, is provided in the stator housing 230 and communicates with a space, which is defined between the stator housing 230 and the fixed scroll 101, through the stator housing 230.

A discharge valve 107a is a check valve in a form of a reed valve, which is arranged on a high pressure chamber 104 side of the discharge port 105 to prevent backflow of the refrigerant, which is discharged from the discharge port 105 into the high pressure chamber 104, toward the working chamber 103. The stopper 107b is a valve stop plate, which limits a maximum degree of opening of the discharge valve 107a. The discharge valve 107a and the valve stop plate 107b are secured to the base plate 101a by a bolt 107c.

A spool 107d is a valve body, which opens and closes the communication passage 106 (hereinafter referred to as an intake port 106). A solenoid valve 107e is a control valve, which controls a pressure in a back pressure chamber 107f by controlling communication between the low pressure port 111 and the back pressure chamber 107f. The spring 107g is a spring means for providing spring force to the spool 107d in a closing direction of the spool 107d for closing the intake port 106. A throttle 107h is a resisting means for exerting a predetermined passage resistance and for communicating between the back pressure chamber 107f and the high pressure chamber 104.

When the solenoid valve 107e is opened, the pressure in the back pressure chamber 107f is reduced in comparison to the high pressure chamber 104. Thus, the spool 107d compresses the spring 107g and is displaced in a right direction in FIG. 2. Therefore, the intake port 106 is opened. A pressure loss at the throttle 107h is substantially large, so that the amount of refrigerant, which flows from the high pressure chamber 104 to the back pressure chamber 107f, is negligibly small.

When the solenoid valve 107e is closed, the pressure of the back pressure chamber 107f becomes equal to the pressure of the high pressure chamber 104. Thus, the spool 107d is displaced by the force of the spring 107g in a left direction in FIG. 2, and thus the intake port 106 is closed by the spool 107d. That is, the spool 107d, the solenoid valve 107e, the back pressure chamber 107f, the spring 107g and the throttle 107h constitute an electric switching valve of a pilot type, which opens and closes the intake port 106.

Next, operation and advantages of the integrated compressor/expander apparatus 10 according to the present embodiment will be described.

1. Pump Mode

This mode is an operational mode for drawing and compressing refrigerant by revolving the orbiting scroll 102 of the pump motor mechanism 100 through application of rotational force to the shaft 109.

Specifically, in this mode, the solenoid valve 107e and the intake port 106 are both closed, and the shaft 109 is rotated. Therefore, similar to the known scroll compressor, in the integrated compressor/expander apparatus 10, refrigerant is drawn from the low pressure port 111 and is compressed in the working chamber 103. Then, the compressed refrigerant is discharged from the discharge port 105 to the high pressure chamber 104, and thereafter the compressed refrigerant is discharged from the high pressure port 110 to the radiator 11 side.

Rotational force can be applied to the shaft 109 by one of two ways. In one way, the integrated compressor/expander apparatus 10 is disconnected from the engine 20 by the electromagnetic clutch 300, and rotational force is applied to the shaft 109 from the dynamo-electric machine 200. In the other way, the integrated compressor/expander apparatus 10 is connected to the engine 20 by the electromagnetic clutch 300, and rotational force is applied to the shaft 109 by the drive force of the engine 20.

In the present embodiment, the shaft 109 is also used as a rotor shaft of the rotor 220. Thus, when the shaft 109 is rotated by the drive force of the engine 20, the dynamo-electric machine 200 acts as the dynamo. The electric power generated from the dynamo-electric machine 200 is desirably saved in a battery or a capacitor, or electric power is desirably supplied to the stator 210 to alleviate the load of the engine 20.

2. Motor Mode

In this mode, superheated high pressure vapor refrigerant, which is heated by the heater 30, is introduced into the pump motor mechanism 100 through the high pressure chamber 104 and is expanded in the pump motor mechanism 100 to revolve the orbiting scroll 102 and the shaft 109, thereby generating mechanical output.

In the present embodiment, the rotor 220 is rotated by the generated mechanical output to generate electric power from the dynamo-electric machine 200, and the generated electric power is saved in a capacitor.

More specifically, the solenoid valve 107e is opened to open the intake port 106, and the superheated high pressure vapor refrigerant, which is heated by the heater 30, is introduced from the high pressure chamber 104 to the working chamber 103 through the intake port 106, thereby expanding the refrigerant.

In this way, the orbiting scroll 102 is revolved due to the expansion of the superheated vapor refrigerant in the direction opposite from that of the pump mode, and thereafter the expanded low pressure refrigerant is outputted from the low pressure port 111 toward a radiator 11 side.

As described above, in the present embodiment, there is provided the fluid machine, which is operable in the pump mode for pressurizing and discharging fluid and is also operable in the motor mode for converting the fluid pressure into kinetic energy and thereafter outputting the kinetic energy as mechanical energy.

Next, the vapor compression refrigeration system of the present embodiment will be described.

1. Air Conditioning Operational Mode

In this operational mode, the refrigeration capacity is exerted at the evaporator 14, and heat is released from refrigerant at the radiator 11. In the present embodiment, the vapor compression refrigeration system is used only in a cooling operation and a dehumidifying operation, both of which utilize cold energy generated in the vapor compression refrigeration system, i.e., utilizes heat absorbing capacity. A heating operation, which uses heat energy generated by the radiator 11, is not performed. However, even at the time of heating operation, operation of the vapor compression refrigeration system is substantially the same as that of the cooling operation and the dehumidifying operation.

Specifically, in a state where the fluid pump 32 is stopped, the switching valve 34 is opened, and the integrated compressor/expander apparatus 10 is operated in the pump mode. Also, at this time, the three-way valve 21 is operated to circulate the coolant while bypassing the heater 30.

In this way, the refrigerant is circulated through the integrated compressor/expander apparatus 10, the heater 30, the radiator 11, the gas-liquid separator 12, the depressurizer 13, the evaporator 14 and the integrated compressor/expander apparatus 10 in this order. At this time, the engine coolant is not circulated through the heater 30, so that refrigerant is not heated by the heater 30, and the heater 30 serves only as the refrigerant passage.

Thus, the low pressure refrigerant, which is depressurized by the depressurizer 13, is vaporized upon absorbing heat from the air to be discharged into a passenger compartment of the vehicle. The vaporized gas phase refrigerant is compressed by the integrated compressor/expander apparatus 10 and thus has high temperature. Then, this hot gas phase refrigerant is cooled and condensed at the radiator 11 by the outside air, which is located outside the passenger compartment.

In the present embodiment, chlorofluorocarbon (HFC134*a*) is used as the refrigerant. However, the refrigerant is not limited to the HFC134*a* and can be any other appropriate refrigerant as long as the refrigerant can be liquefied at the high pressure side of the system.

2. Waste Heat Recovering Operational Mode

In this operational mode, the air conditioning apparatus, more specifically, the integrated compressor/expander apparatus 10 is stopped, and waste heat of the engine 20 is recovered as recyclable energy by a waste heat recovering system, which includes the integrated compressor/expander apparatus 10.

Specifically, the switching valve 34 is closed, and the fluid pump 32 is operated. Furthermore, the integrated compressor/expander apparatus 10 is placed in the motor mode, and the three-way valve 21 is operated to circulate the engine coolant outputted from the engine 20 to the heater 30.

In this way, the refrigerant is circulated through the gas-liquid separator 12, the first bypass circuit 31, the heater 30, the integrated compressor/expander apparatus 10, the second bypass circuit 34, the radiator 11 and the gas-liquid separator 12 in this order. A flow direction of the refrigerant, which passes the radiator 11, is opposite from a flow direction of the refrigerant at the time of air conditioning operational mode.

Thus, superheated vapor, which is heated by the heater 30, is supplied to the integrated compressor/expander apparatus 10. The vapor refrigerant, which has entered the integrated compressor/expander apparatus 10, is isentropically expanded in the pump motor mechanism 100 and loses its entropy. Thus, in the integrated compressor/expander apparatus 10, electric power, which corresponding to the amount of reduced enthalpy, is saved in the capacitor.

The refrigerant, which is outputted from the integrated compressor/expander apparatus 10, is cooled by the radiator 11 and is thus condensed. The condensed refrigerant is accumulated in the gas-liquid separator 12. The liquid phase refrigerant in the gas-liquid separator 12 is pumped to the heater 30 by the fluid pump 32. The fluid pump 32 pumps the liquid phase refrigerant to the heater 30 by a pressure that does not cause backflow of the superheated vapor, which is generated in the heater 30, to the gas-liquid separator 12.

SECOND EMBODIMENT

Figure 3:
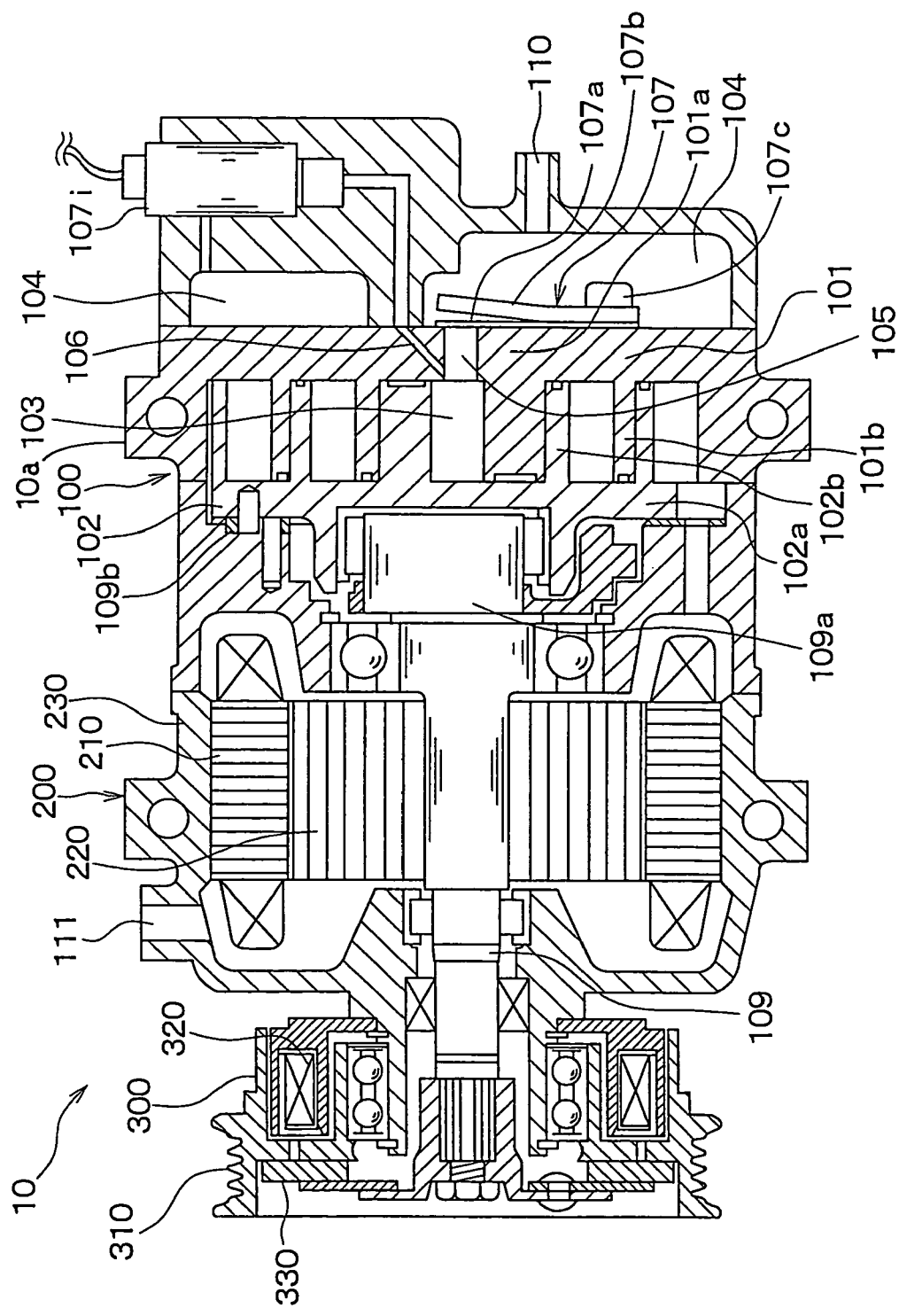
FIG. 3 is a cross sectional view of an integrated compressor/expander apparatus according to a second embodiment of the present invention.

In the first embodiment, the intake port 106 is constituted by the switching valve of the pilot type. In a second embodiment, as shown in FIG. 3, a switching solenoid valve 107*i* of a direct drive type, which directly opens and closes the intake port 106, is used.

THIRD EMBODIMENT

Figure 4:
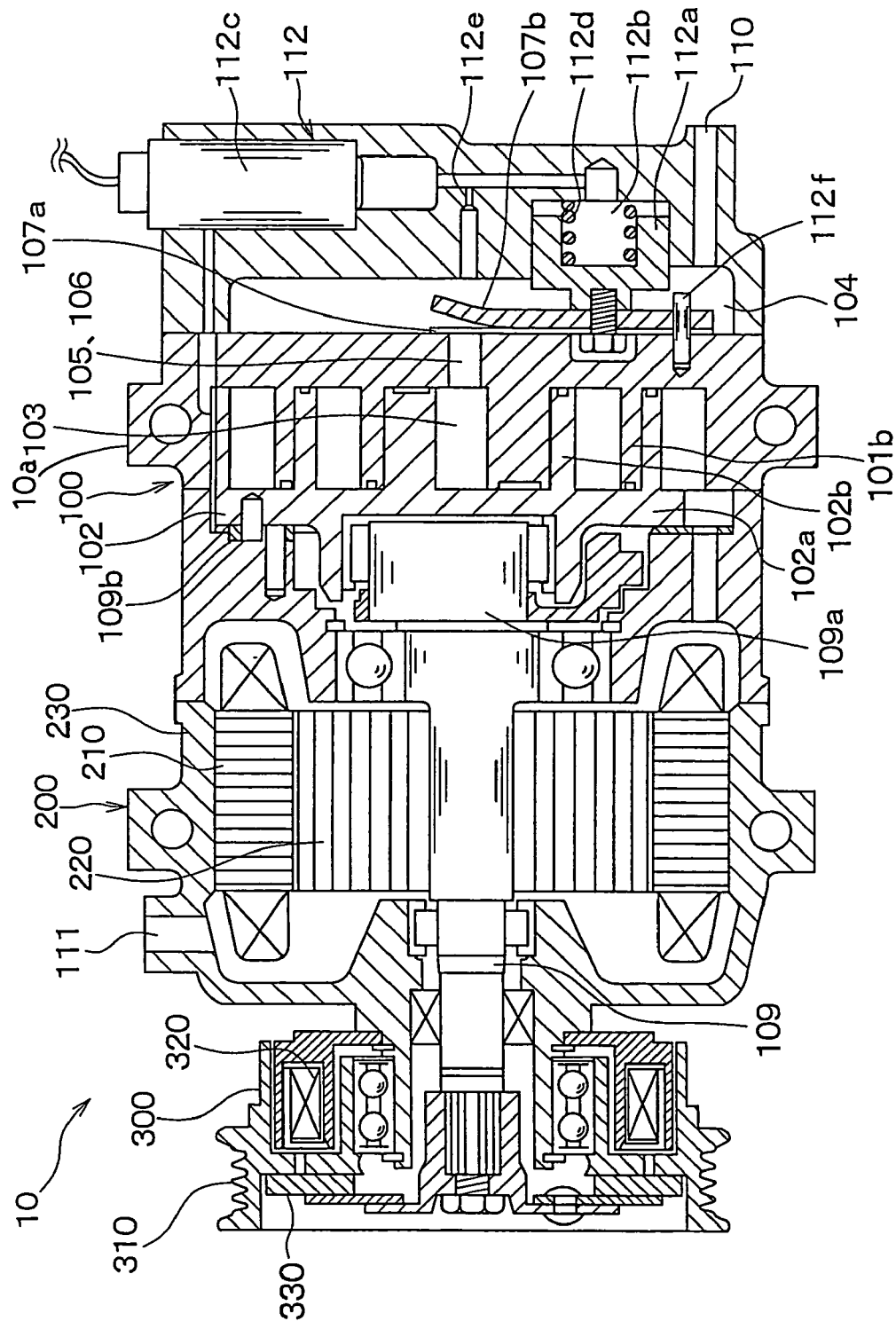
FIG. 4 is a cross sectional view of an integrated compressor/expander apparatus according to a third embodiment of the present invention.

In a third embodiment, as shown in FIG. 4, the discharge port 105 also acts as the intake port 106, and the discharge valve 107*a*, which includes the valve stop plate 107*b*, is forcefully displaced by an actuator 112 to open the discharge port 105 (intake port 106) at the time of operation in the motor mode.

The actuator 112 of the present embodiment is an actuator of a pilot type, which uses a pressure difference in a manner similar to that of the mechanism, which displaces the spool 107.

More specifically, the actuator 112 includes a piston 112*a*, a solenoid valve 112*c*, a spring 112*d* and a throttle 112*e*. The discharge valve 107*a*, which includes the valve stop plate 107*b*, is secured to the piston 112*a*. The solenoid valve 112*c* controls a pressure in a back pressure chamber 112*b* by controlling communication between the low pressure port 111 and the back pressure chamber 112*b*. The spring 112*d* applies spring force to the piston 112*a* to displace the discharge valve 107*a*, i.e., the piston 112*a* in a closing direction for closing the discharge port 105 (intake port 106). The throttle 112*e* exerts a predetermined passage resistance and communicates between the back pressure chamber 112*b* and the high pressure chamber 104. A rotation limiting pin 112*f* is a rotation limiting means for limiting rotation of the piston 112*a*.

When the solenoid valve 112*c* is opened, pressure in the back pressure chamber 112*b* is reduced in comparison to the high pressure chamber 104. Thus, the piston 112*a* moves in a right direction in the drawing and compresses the spring 112*d*. As a result, the discharge port 105 (intake port 106) is opened. On the other hand, when the solenoid valve 112*c* is closed, the pressure of the back pressure chamber 112*b* becomes substantially the same as the pressure of the high pressure chamber 104. Thus, the piston 112*a* is displaced by the force of the spring 112*d* in a left direction in the drawing. As a result, the discharge port 105 (intake port 106) is closed.

In the present embodiment, the actuator 112 of the pilot type is used. However, it should be understood that an actuator of a direct drive type, which directly displaces the discharge valve 107*a* that includes the valve stop plate 107*b*, can be used in place of the actuator 112 of the pilot type.

FOURTH EMBODIMENT

Figure 5:
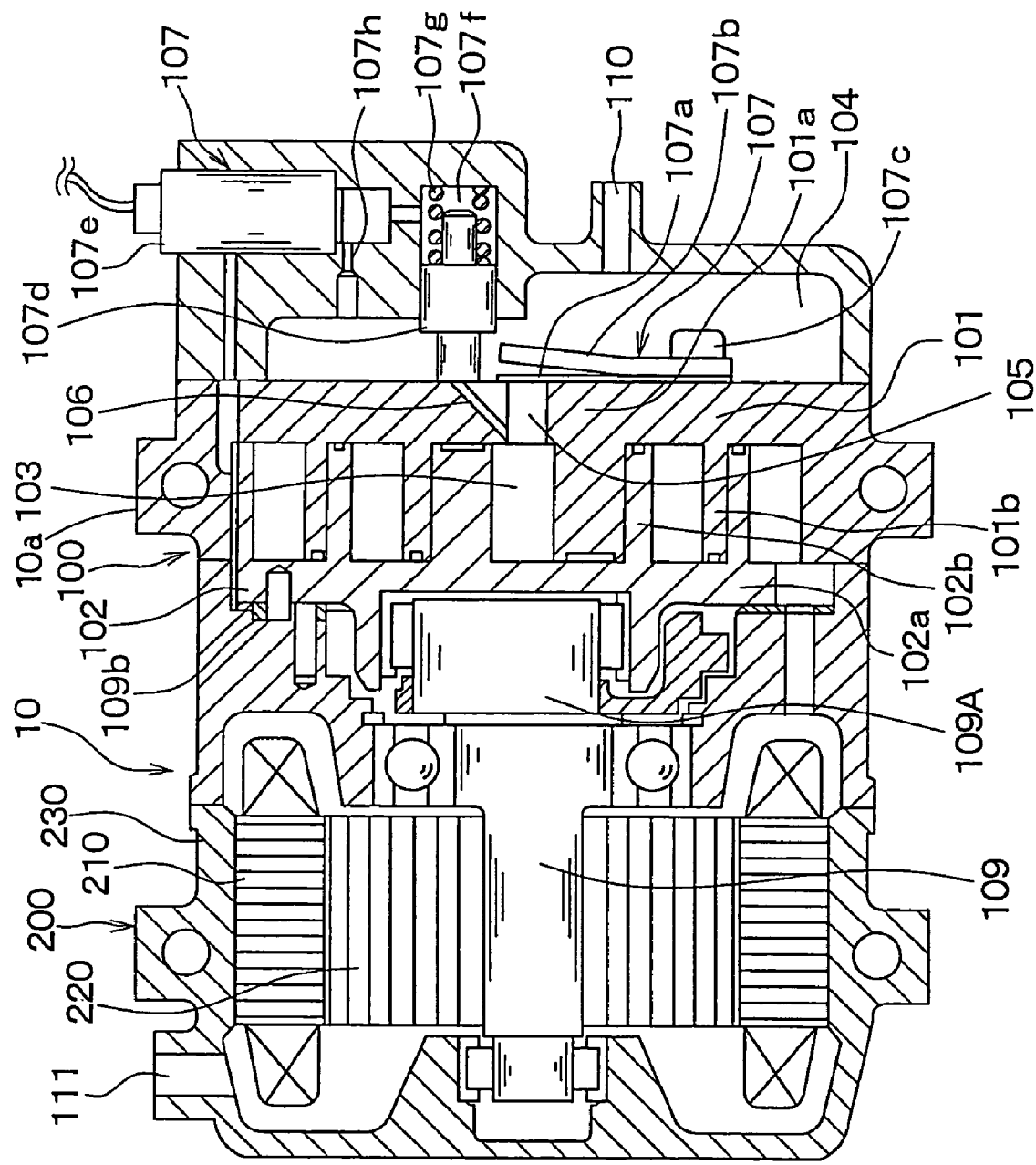
FIG. 5 is a cross sectional view of an integrated compressor/expander apparatus according to a fourth embodiment of the present invention.

The integrated compressor/expander apparatus 10 of each of the above embodiments includes the electromagnetic clutch 300 to allow driving of the integrated compressor/expander apparatus 10 by the multiple drive sources. In a fourth embodiment, as shown in FIG. 5, the electromagnetic clutch 300 is eliminated. At the time of operation in the pump mode, the pump motor 100 is driven only by the dynamo-electric machine 200.

FIG. 5 shows the integrated compressor/expander apparatus 10, from which the electromagnetic clutch 300 of the first embodiment is eliminated. However, the present invention is not limited to this. This arrangement is equally applicable to the integrated compressor/expander apparatus 10 of the second embodiment or of the third embodiment.

FIFTH EMBODIMENT

An integrated compressor/expander apparatus 10 according to a fifth embodiment will be described.

Figure 6:
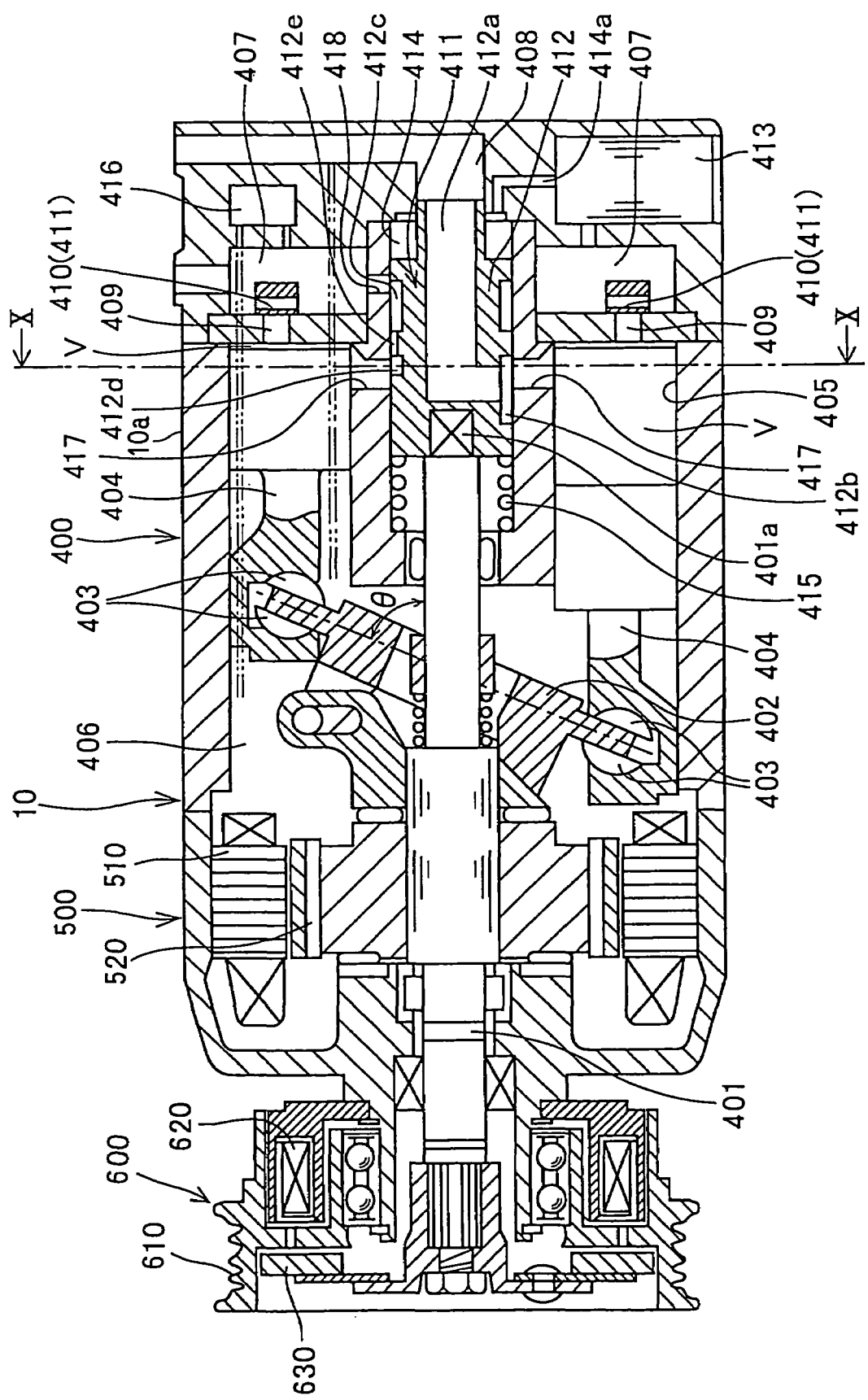
FIG. 6 is a cross sectional view of an integrated compressor/expander apparatus according to a fifth embodiment of the present invention operated in a motor mode.

FIG. 6 is a cross sectional view of the integrated compressor/expander apparatus 10. The integrated compressor/expander apparatus 10 includes a pump motor mechanism 400, a dynamo-electric machine (motor generator) 500 and an electromagnetic clutch 600. The pump motor mechanism 400 and the pump motor mechanism 500 are received in the housing 10a. The pump motor mechanism 400 compresses or expands gas phase refrigerant (fluid). When the dynamo-electric machine 500 receives rotational energy, the dynamo-electric machine 500 outputs electric energy. Furthermore, when the dynamo-electric machine 500 receives electric energy, the dynamo-electric machine 500 outputs rotational energy. The electromagnetic clutch 600 enables and disables transmission of drive force from the engine (serving as an external drive source) 20 to the pump motor mechanism 400.

The dynamo-electric machine 500 includes a stator 510 and a rotor 520, which is rotated in the stator 510. Furthermore, the stator 510 is a stator coil, which includes a wound coil. The rotor 520 is a magnet rotor, which includes permanent magnets embedded therein. When electric power is supplied to the stator 510, the dynamo-electric machine 500 is operated as an electric motor, which rotates the rotor 520 to drive the pump motor mechanism 400. Furthermore, when torque to rotate the rotor 520 is supplied to the dynamo-electric machine 500, the dynamo-electric machine 500 is operated as a dynamo, which generates electric power.

The electromagnetic clutch 600 includes a pulley 610, an exciting coil 620 and a friction plate 630. The pulley 610 receives the drive force from the engine 20 through a V-belt T (FIG. 1). The exciting coil 620 generates a magnetic field. The friction plate 630 is displaced by electromagnetic force generated by the magnetic field, which is induced by the exciting coil 620. When the electromagnetic clutch 600 connects between the engine 20 and the integrated compressor/expander apparatus 10, the exciting coil 620 is energized. When the electromagnetic clutch 600 disconnects between the engine 20 and the integrated compressor/expander apparatus 10, the exciting coil 620 is deenergized.

The structure of the pump motor mechanism 400 is substantially the same as that of a known swash plate compressor mechanism that has a variable volume, i.e., a variable capacity. The structure of the pump motor mechanism 400 will be described below.

A swash plate 402 is formed as a generally disk shaped body, which is rotated integrally with a shaft (serving as a drive shaft) 401 while the swash plate 402 is tilted relative to an axial direction (longitudinal direction) of the shaft 401. Each piston 404 is connected to a radially outer part of the swash plate 402 through a pair of shoes 403 in a manner that allows swing motion.

The multiple pistons 404 (the number of the pistons 404 in the present embodiment is five) are arranged around the shaft 401 and are synchronously reciprocated while maintaining a predetermined phase difference therebetween.

The swash plate 402 and the shoes 403 serve as a converting mechanism that converts rotational movement of the shaft 401 into reciprocal movement and thereafter conducts the converted reciprocal movement to the pistons 404 at the time of operation in the pump mode. Furthermore, the swash plate 402 and the shoes 403 also serve as a converting mechanism that converts reciprocal movement of the pistons 404 into rotational movement and thereafter conducts the converted rotational movement to the shaft 401 at the time of operation in the motor mode.

When each piston (movable member of the present invention) 404 slidably reciprocates in a corresponding cylinder bore 405, a volume of a corresponding working chamber V is increased and is then decreased. At this time, a stroke of the piston 404 is increased when an angle (hereinafter referred to as a tilt angle θ), which is defined between the swash plate 402 and the shaft 401, is decreased. Also, the stroke of the piston 404 is decreased when the tilt angle θ is increased. Thus, in the present embodiment, a volume, i.e., a capacity of the pump motor mechanism 400 is changed by changing the tilt angle θ of the swash plate 402. The swash plate 402 corresponds to a capacity variable mechanism of the present invention.

The capacity of the pump motor mechanism 400 is a theoretical flow rate of fluid, which is discharged from the pump motor mechanism 400 or is drawn (expanded) into the pump motor mechanism 400 per rotation of the shaft 401. That is, the capacity of the pump motor mechanism 400 is a volume, which is determined based on a product of a stroke of the piston 404 and a diameter of the piston 404.

A space (hereinafter referred to as a swash plate chamber 406), which receives the swash plate 402, is communicated with a high pressure chamber (high pressure part of the present invention) 407 and a low pressure chamber (low pressure part of the present invention) 408, as indicated by dot-dot-dash lines in FIGS. 6 and 8. A pressure control valve (corresponding to a control apparatus of the present invention) 416, which adjusts pressure of the high pressure chamber 407 and conducts the adjusted pressure to the swash plate chamber 406, is provided in the passage that connects between the swash plate chamber 406 and the high pressure chamber 407. The swash plate chamber 406 and the low pressure chamber 408 are always communicated to one another through a fixed throttle, such as an orifice, which induces a predetermined pressure loss.

The tilt angle θ of the swash plate 402 is set based on a balance between the pressure in the swash plate chamber 406 and a compressive reaction force generated in each corresponding working chamber V. Thus, in the present embodiment, when the tilt angle θ is reduced, i.e., when the capacity of the pump motor mechanism 400 is increased, a degree of opening of the pressure control valve 416 is reduced to reduce the pressure in the swash plate chamber 406. On the other hand, when the tilt angle θ is increased, i.e., when the capacity of the pump motor mechanism 400 is reduced, the degree of opening of the pressure control valve 416 is increased to increase the pressure in the swash plate chamber 406.

The high pressure chamber 407 serves as a space, into which high pressure fluid discharged from each working chamber V is supplied at the time of operation in the pump mode. At the time of operation in the motor mode, the high pressure chamber 407 serves as a space, into which superheated high pressure vapor refrigerant is supplied from the heater 30.

The low pressure chamber 408 serves as a space, into which low pressure vapor refrigerant outputted from the evaporator 14 is supplied at the time of operation in the pump mode. At the time of operation in the motor mode, the low pressure chamber 408 serves as a space, into which low pressure fluid expanded in the pump motor mechanism 400 is supplied.

Each discharge port 409 is a communication passage, which communicates between the high pressure chamber 407 and the corresponding working chamber V. Each check valve 410 prevents backflow of refrigerant from the high pressure chamber 407 to the corresponding working chamber V.

Each check valve 410 of the present embodiment is in a form of a reed valve, which serves as a valve body and is placed in the high pressure chamber 407. When dynamic pressure is applied to the check valve 410 from the working chamber V toward the high pressure chamber 407, the check valve 410 is opened. On the other hand, when dynamic pressure is applied to the check valve 410 from the high pressure chamber 407 toward the working chamber V, the check valve 410 is closed.

A generally cylindrical valve body (rotary valve) 412 is engaged with a double-sided portion 401a that is arranged at one end of the shaft 401 and has two sides, which are generally flat and are parallel to one another. Because of the engagement between the rotary valve 412 and the double sided portion 401a, the rotary valve 412 rotates integrally with the shaft 401. At the time of operation in the pump mode, the rotary valve 412 communicates between the low pressure chamber 408 and the corresponding working chamber V in an intake stroke and then blocks backflow of fluid from the working chamber V to the low pressure chamber 408 in a compression stroke. At the time of operation in the motor mode, the rotary valve 412 communicates between the high pressure chamber 407 and the corresponding working chamber V in an intake stroke. Then, the rotary valve 412 blocks backflow of fluid from the working chamber V to the high pressure chamber 407 in an expansion stroke. Thereafter, the rotary valve 412 communicates between the working chamber V and the low pressure chamber 408 while blocking backflow of fluid from low pressure chamber 408 to the working chamber V in an exhaust stroke.

Figure 7:
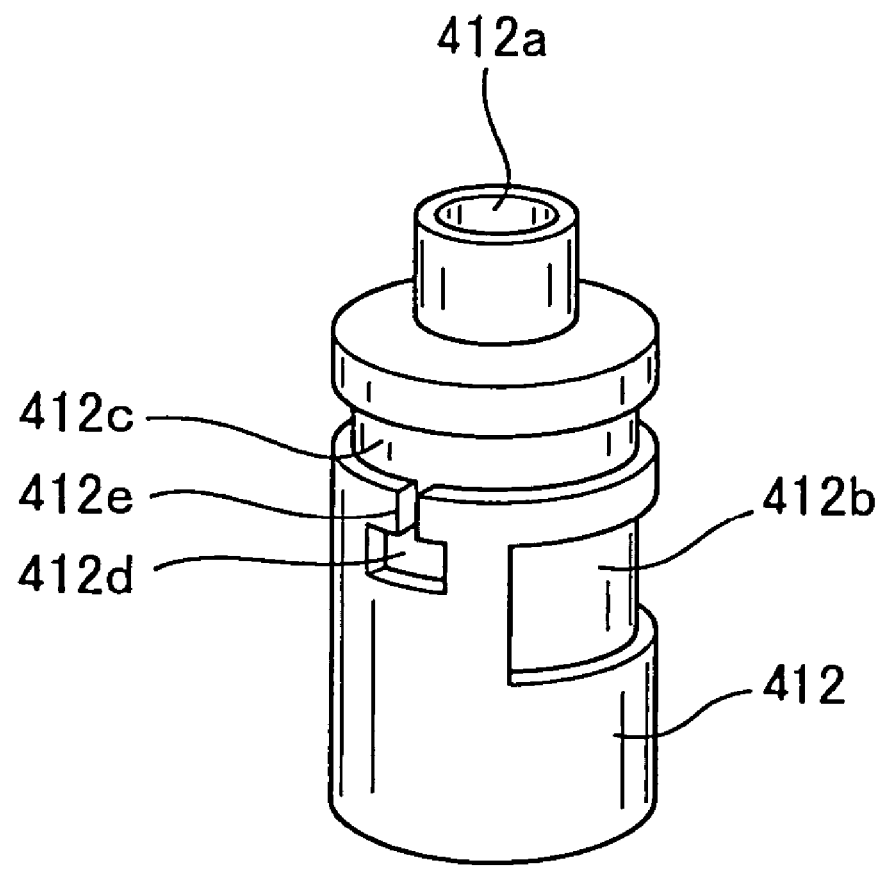
FIG. 7 is a perspective view of a valve body used in the integrated compressor/expander apparatus according to the fifth embodiment of the present invention.

As shown in FIG. 7, the rotary valve 412 includes a low pressure introducing passage 412a, which is provided inside the rotary valve 412 and is always communicated with the low pressure chamber 408. A low pressure groove 412b, a high pressure introducing groove 412c, a high pressure groove 412d and a communication groove 412e are provided in an outer peripheral surface of the rotary valve 412.

The low pressure groove 412b is arranged on a shaft 401 side of the rotary valve 412 such that the low pressure groove 412b extends along a semicircular arc. Furthermore, the low pressure groove 412b is in communication with the low pressure introducing passage 412a. The high pressure introducing groove 412c is arranged along an entire outer peripheral surface of the rotary valve 412 on one side of the low pressure groove 412b, which is opposite from the shaft 401. The high pressure groove 412d is shaped into a rectangular shape at a location that corresponds to the high pressure introducing groove 412c side of the low pressure groove 412b. The high pressure introducing groove 412c and the high pressure groove 412d are communicated to one another through the communication groove 412e.

The low pressure groove 412b is communicated with the corresponding working chamber V through the communication port 417. Furthermore, the high pressure introducing groove 412c is always communicated with the high pressure chamber 407 through a high pressure introducing hole 418. Furthermore, movement of the rotary valve 412 toward or away from the shaft 401 results in two states. In one state, the high pressure groove 412d is communicated with the corresponding working chamber V through the communication port 417, as shown in FIG. 6. In the other sate, the high pressure groove 412d is not communicated with the corresponding working chamber V through the communication port 417, as shown in FIG. 8.

Figure 8:
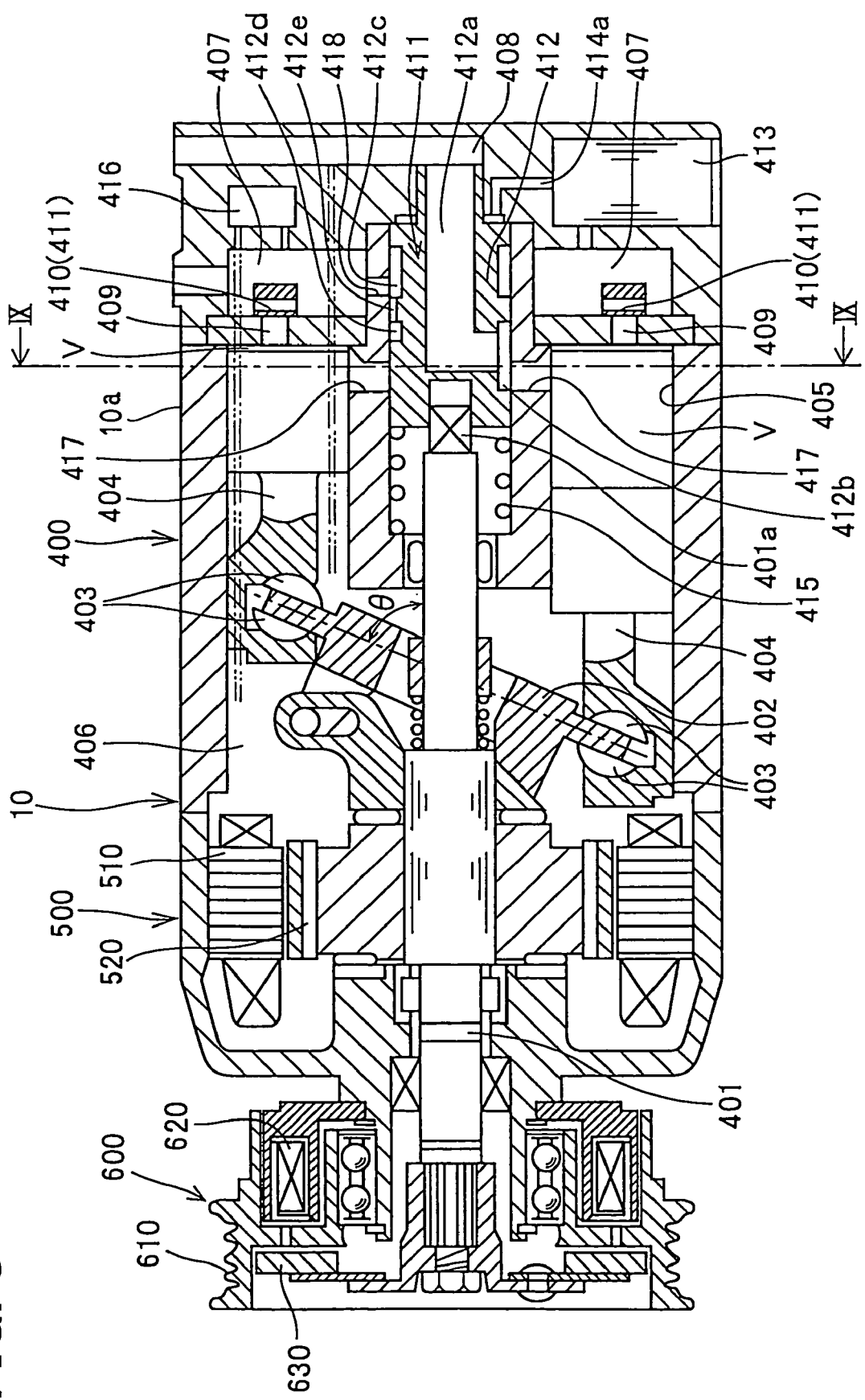
FIG. 8 is a cross sectional view of the integrated compressor/expander apparatus according to the fifth embodiment of the present invention.

When the rotary valve 412 is rotated, the low pressure groove 412b is sequentially communicated with the respective communication ports 417 (the respective working chambers V) in synchronism with the rotation of the shaft 401, i.e., in synchronism with the reciprocal movements of the pistons 404, as shown in FIGS. 6 and 8. Also, during the rotation of the rotary valve 412, the high pressure groove 412d is sequentially communicated with the respective communication ports 417 (the respective working chambers V) in synchronism with the rotation of the shaft 401, i.e., in synchronism with the reciprocal movements of the pistons 404, as shown in FIG. 8.

A back pressure chamber 414, which receives high pressure of the high pressure chamber 407, is provided in one axial end of the rotary Valve 412, as shown in FIG. 6. A solenoid valve 413, which controls a communicational state of a back pressure passage 414a that communicates between the back pressure chamber 414 and the high pressure chamber 407, is provided in the back pressure passage 414a. Similar to the swash plate chamber 406, the back pressure chamber 414 and the low pressure chamber 408 are always communicated to one another through a fixed throttle (not shown), such as an orifice that induces a predetermined pressure loss.

A spring 415, which exerts pressure to urge the rotary valve 412 toward the one axial end, is arranged at the other axial end of the rotary valve 412. Pressure of the back pressure chamber 414 is adjusted by the solenoid valve 413 to displace the rotary valve 412 in a direction parallel to the axial direction of the shaft 401.

The solenoid valve 413, the back pressure chamber 414 and the spring 415 form an actuator, which switches operational mode between the pump mode and the motor mode.

Furthermore, in the present embodiment, the valve body 412, the check valves 410, the solenoid valve 413, the back pressure chamber 414 and the spring 415 form a valve mechanism (411) recited in the appended claims. The valve mechanism (411) communicates the low pressure part (408) to the high pressure part (407) through the working chamber (V) while preventing backflow of fluid at the time of operation in the pump mode. The valve mechanism (411) communicates the high pressure part (407) to the low pressure part (408) through the working chamber (V) while preventing backflow of fluid at the time of operation in the motor mode.

Next, operation of the compressor/expander apparatus 10 of the present embodiment will be described.

1. Pump Mode

This mode is an operational mode for drawing and compressing refrigerant by applying rotational force to the shaft 401 to reciprocate the pistons 404 of the pump motor mechanism 400.

Specifically, in the state where the fluid pump 32 is stopped, the switching vale 34 is opened, and the three-way valve 21 is switched to prevent circulation of the engine coolant to the heater 30. Furthermore, the solenoid valve 413 of the integrated compressor/expander apparatus 10 is closed, and as shown in FIG. 8, the rotary valve 412 is moved in a right direction in the drawing to communicate between the low pressure groove 412b and the corresponding working chamber V and to prevent communication between the high pressure groove 412d and the corresponding working chamber V.

In this way, when the piston 404 slides from a top dead center to a bottom dead center, low pressure vapor refrigerant supplied from the evaporator 14 is drawn into the working chamber V through the low pressure chamber 408, the low pressure introducing passage 412a, the low pressure groove 412b and the communication port 417. Here, the low pressure introducing passage 412a, the low pressure groove 412b and the communication port 417 form a communication passage that communicates between the low pressure chamber 408 and the corresponding working chamber V. Then, when the piston 404 slides from the bottom dead center to the top dead center, the communication port 417 is closed by the outer peripheral surface of the rotary valve 412, and the low pressure vapor refrigerant is compressed in the working chamber V. Then, the compressed high pressure refrigerant is discharged into the high pressure chamber 407 through the discharge port 409.

Figure 9:
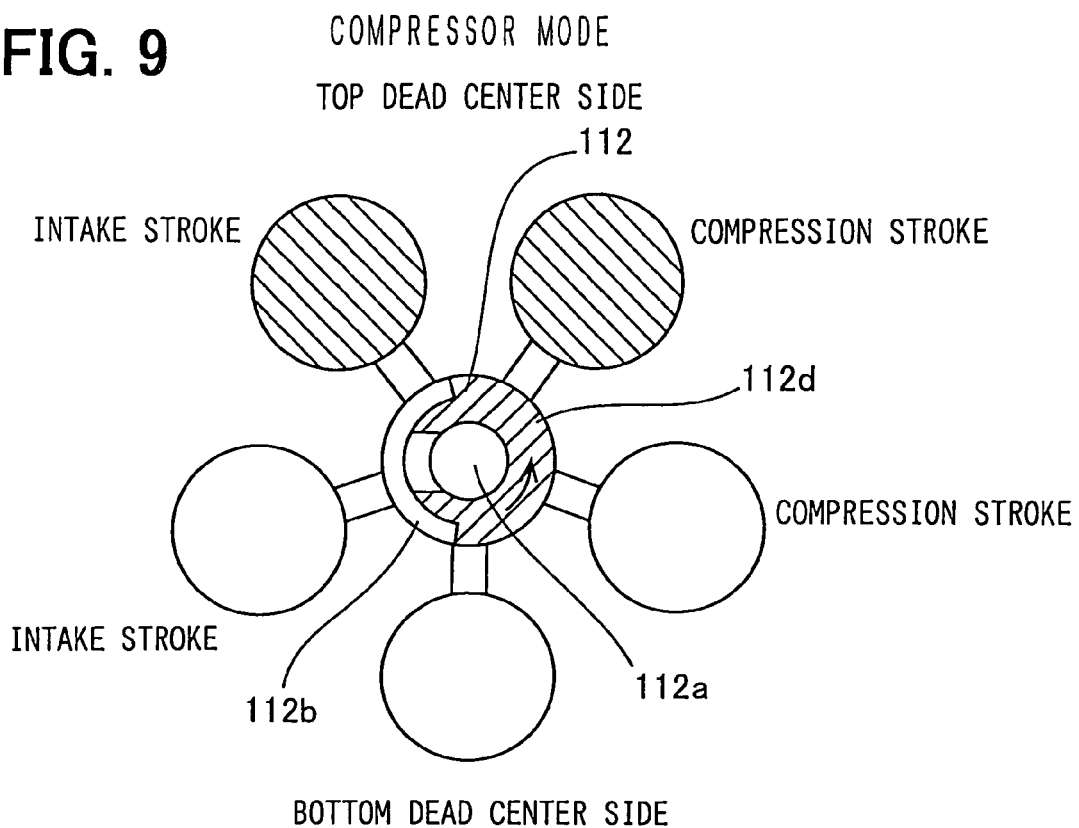
FIG. 9 is a schematic cross sectional view along line IX-IX in FIG. 8.

At this time, as shown in FIG. 9, the low pressure groove 412d is communicated sequentially with the respective working chambers V in synchronism with the rotation of the shaft 401. Thus, refrigerant is drawn and is compressed in each working chamber V in a continuous manner. When the tilt angle θ of the swash plate 402 is changed by the pressure control valve 416 according to a required amount of compressed refrigerant, a capacity of the pump motor mechanism 400 is adjusted.

The refrigerant, which is discharged from the high pressure chamber 407, is circulated through the heater 30, the switching valve 34, the radiator 11, the gas-liquid separator 12, the depressurizer 13, the evaporator 14, the check valve 14a and the low pressure chamber 408 of the integrated compressor/expander apparatus 10 in this order. Since the engine coolant is not circulated to the heater 30, the refrigerant is not heated in the heater 30, and the heater 30 simply serves as a refrigerant passage.

At this time, rotational force can be applied to the shaft 401 by one of two ways. In one way, the electromagnetic clutch 600 is energized to connect between the engine 20 and the integrated compressor/expander apparatus 10 to provide the rotational force to the shaft 401 by the drive force of the engine 20. In the other way, the electromagnetic clutch 600 is deenergized to disconnect between the engine 20 and the integrated compressor/expander apparatus 10 to operate the dynamo-electric machine 500 as the motor to apply the rotational force to the shaft 401.

When the rotational force is applied to the shaft 401 by the drive force of the engine 20, the rotor 520 is rotated together with the shaft 401 to generate electric power from the dynamo-electric machine 500. Thus, in the present embodiment, the electric power generated by the dynamo-electric machine 500 is saved in a battery or a capacitor.

2. Motor Mode

This is an operational mode where high pressure superheated vapor refrigerant, which is heated by the heater 30, is introduced from the high pressure chamber 407 into the pump motor mechanism 400 and is expanded in the corresponding working chamber V to reciprocate the corresponding piston 404 to rotate the shaft 401, thereby providing mechanical output. In the present embodiment, the rotor 520 is rotated by the generated mechanical output to operate the dynamo-electric machine 500 as the dynamo to generate electric power. Then, the generated electric power is saved in the capacitor.

Specifically, in the sate where the switching valve 34 is closed, the fluid pump 32 is operated, and the three-way valve 21 is switched to circulate the engine coolant to the heater 30. Furthermore, in the state where power supply to the electromagnetic clutch 600 of the integrated compressor/expander apparatus 10 is stopped to disconnect the electromagnetic clutch 600, the solenoid valve 413 is opened to move the rotary valve 412 in a left direction in the drawing to communicate between the low pressure groove 412b and the corresponding working chamber V and to communicate between the high pressure groove 412d and the working chamber V, as shown in FIG. 6.

In this way, when the piston 404 slides from the top dead center to the bottom dead center, the superheated vapor refrigerant is supplied from the heater 30 to the corresponding working chamber V through the high pressure chamber 407, the high pressure introducing hole 418, the high pressure introducing groove 412c, the communication groove 412e, the high pressure groove 412d and the communication port 417. Here, the high pressure introducing hole 418, the high pressure introducing groove 412c, the communication groove 412e, the high pressure groove 412d and the communication port 417 form a communication passage that communicates between the high pressure chamber 407 and the working chamber V in the motor mode. The communication port 417 is closed by the outer peripheral surface of the rotary valve 412, and the superheated vapor refrigerant is expanded in the corresponding working chamber V to displace the piston 404 toward the bottom dead center and thereby to rotate the shaft 401. Furthermore, when the piston 404 slides from the bottom dead center to the top dead center, the communication port 417 is communicated with the low pressure groove 412b. Thus, the expanded low pressure refrigerant is supplied to the low pressure introducing passage 412a and is outputted from the low pressure chamber 408 to a radiator 11 side.

Figure 10:
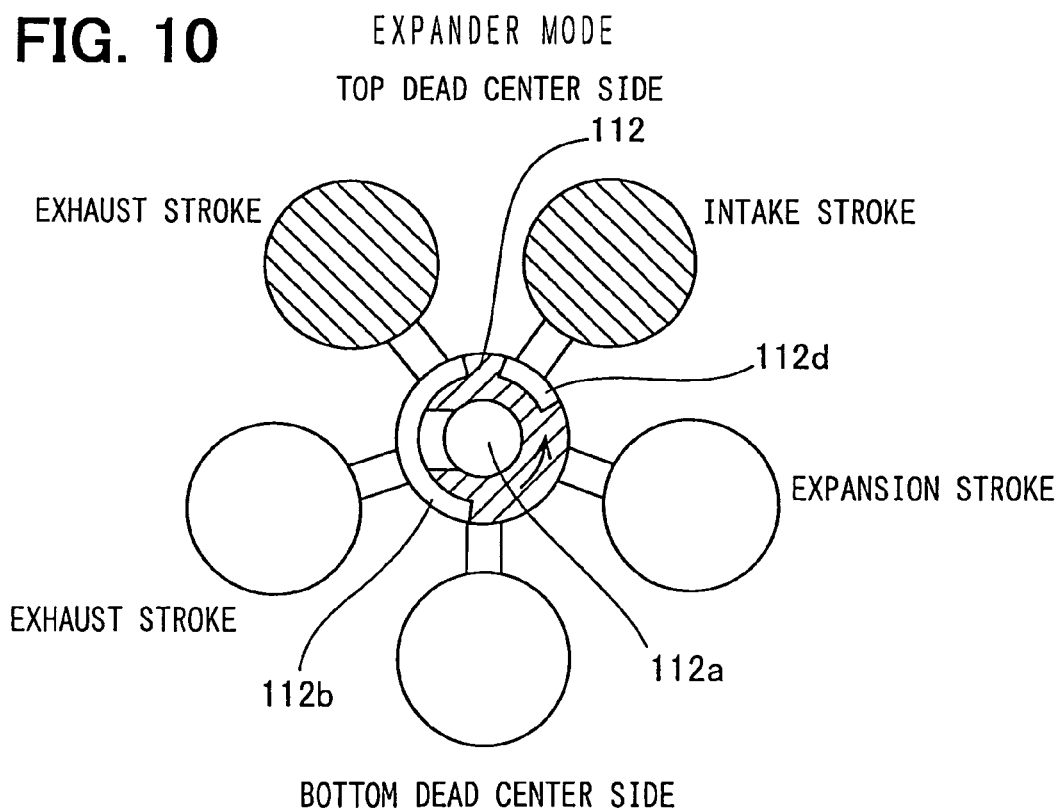
FIG. 10 is a schematic cross sectional view along line X-X in FIG. 6.

At this time, as shown in FIG. 10, the low pressure groove 412b is sequentially communicated with the respective working chambers V in synchronism with the rotational movement of the shaft 401. Similarly, the high pressure groove 412d is sequentially communicated with the respective working chambers V in synchronism with the rotational movement of the shaft 401. Thus, the superheated vapor refrigerant is sequentially expanded in the respective working chambers V.

Furthermore, the corresponding check valve 410 is closed by the high pressure superheated vapor refrigerant, which is supplied to the high pressure chamber 407, and backflow of the refrigerant from the working chamber V to the high pressure chamber 407 is prevented.

In the Rankine cycle, the refrigerant is circulated from the gas-liquid separator 12, the first bypass circuit 31, the fluid pump 32, the heater 30, the integrated compressor/expander apparatus 10 (the high pressure chamber 407 to the low pressure chamber 408), the second bypass circuit 33, the check valve 33a, the radiator 11 and the gas-liquid separator 12 in this order. The fluid pump 32 pumps liquid phase refrigerant toward the heater 30 at the pressure that does not cause backflow of the superheated vapor refrigerant, which is heated and is generated in the heater 30, toward the gas-liquid separator 12.

Figure 11A:
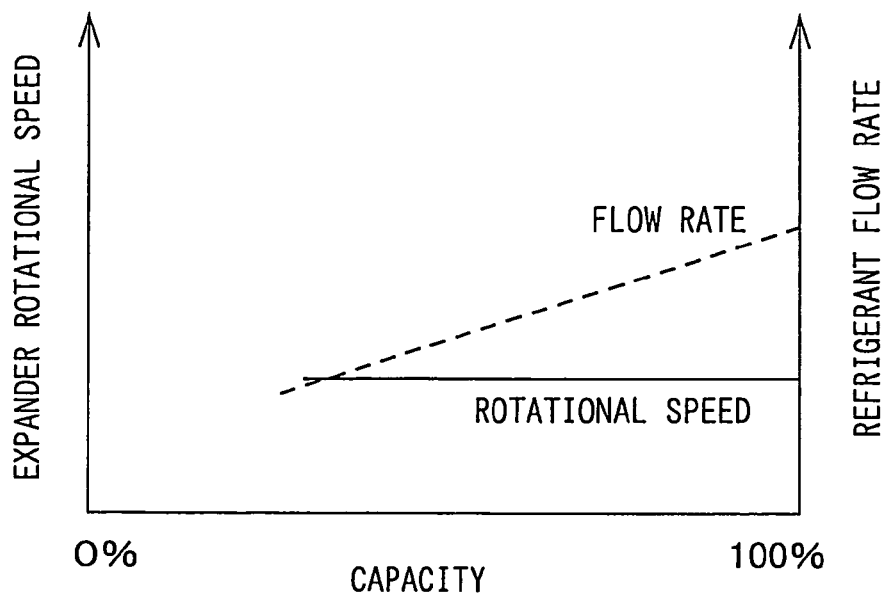
FIG. 11A is a graph indicating relationship among a rotational speed of a pump motor mechanism (expander), a flow rate of refrigerant and a capacity of the pump motor mechanism in one case of the fifth embodiment where the flow rate of refrigerant is varied.

At the time of operation in the motor mode, as shown in FIG. 11A, which shows a case where flow rate of refrigerant is varied, the tilt angle θ of the swash plate 402 is changed by the pressure control valve 416 according to the flow rate of the superheated refrigerant supplied from the heater 30 to the high pressure chamber 407 to adjust the capacity of each working chamber V to adjust a volume of the superheated refrigerant expanded in the working chamber V of the pump motor mechanism 400. That is, when a flow rate of the superheated refrigerant is reduced, the capacity of the pump motor mechanism 400 is reduced to maintain the rotational speed of the pump motor mechanism 400 induced by the expansion of the refrigerant.

For example, when the flow rate of superheated vapor refrigerant is low and constant, the capacity is reduced to increase the rotational speed of the pump motor mechanism

Figure 11B:
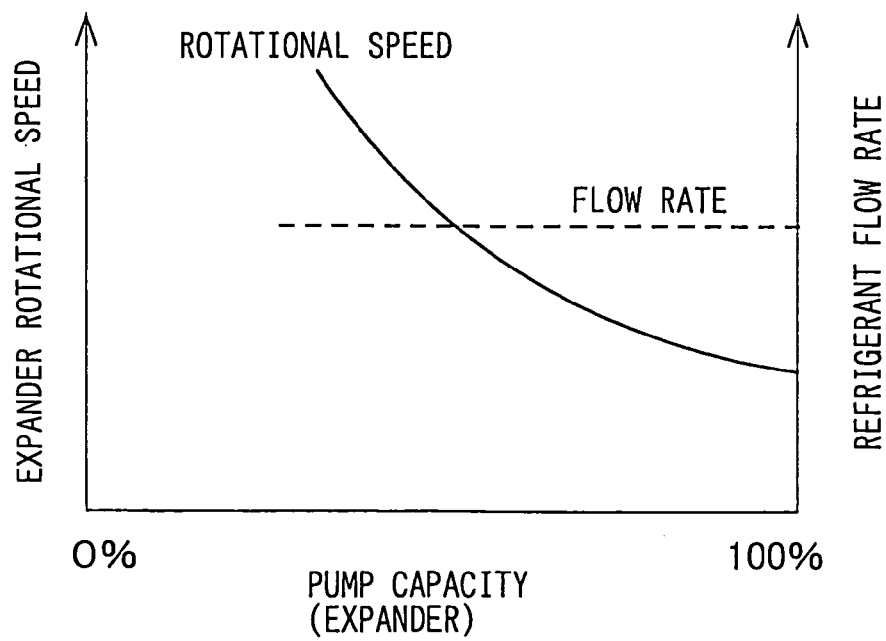
FIG. 11B is a graph indicating relationship among a rotational speed of a pump motor mechanism (expander), a flow rate of refrigerant and a capacity of the pump motor mechanism in another of the fifth embodiment where the flow rate of refrigerant is kept constant.

400, as shown in FIG. 11B, which shows a case where the flow rate of refrigerant is kept constant.

It should be noted that when the rotary valve 412 is modified such that the low pressure groove 412b of the rotary valve 412 is provided in the outer peripheral surface of the rotary valve 412 at an opposite location, which is diametrically opposite from the low pressure groove 412b indicated in FIG. 7, the rotational direction can be changed to an opposite direction, which is opposite from the direction described above, at the time of operation in the motor mode.

Because of the above described structure and operation, in the integrated compressor/expander apparatus 10, the rotary valve 412 allows provision of the novel fluid machine, which has the pump mode and the motor mode.

At the time of operation in the motor mode, the capacity of the pump motor mechanism 400 can be changed. Thus, the time required to expand the superheated vapor refrigerant can be adjusted, and influences of leakage of superheated vapor refrigerant can be reduced to improve the efficiency at the time of operation in the motor mode.

Specifically, when the flow rate of the superheated vapor refrigerant is reduced, the capacity is reduced. Thus, the expansion time, i.e., the rotational speed of the pump motor mechanism 400 can be kept constant based on the flow rate, so that a predetermined amount of electric power generated by the dynamo-electric machine 500 can be maintained.

Furthermore, when the flow rate of superheated vapor refrigerant is low and is constant, the rotational speed of the pump motor mechanism 400 can be increased by reducing the capacity to increase the amount of electricity generated by the dynamo-electric machine 500.

At the time of operation in the pump mode, the same pressure control valve 416 is used to change the tilt angle θ of the swash plate 402 to adjust the capacity. Thus, without requiring addition of a control device, the structure can be simplified.

When the electromagnetic clutch 600 is connected at the time of operation in the motor mode, the power assist can be provided to the engine 20.

Modifications

In the first to fourth embodiments, the scroll pump motor mechanism 100 is used as the pump motor mechanism 100. Furthermore, in the fifth embodiment, the capacity variable swash plate mechanism (having the pistons 404 at one side of the swash plate) is used as the pump motor mechanism 400. However, the pump motor mechanism 100, 400 is not limited to the above described ones. For example, a double-sided swash plate mechanism, which has the pistons 404 on both sides, or scroll type mechanism can be used as the pump motor mechanism 400. Also, other pump motor mechanism, such as a rotary pump motor mechanism, vane pump motor mechanism, can be used as the pump motor mechanism 100, 400.

In the above embodiments, the electromagnetic clutch is used as the power transmission mechanism or arrangement, which enables and disables transmission of the drive force. However, the present invention is not limited to this. For example, a one way clutch can be used in place of the electromagnetic clutch.

Furthermore, in the above embodiments, the energy, which is recovered by the integrated compressor/expander 10, is saved in the capacitor. However, the energy can be saved as mechanical energy in a form of kinetic energy saved in a flywheel or can be saved as mechanical energy in a form of spring energy saved in a spring.

The fluid machine of the present invention is applied to the vehicular vapor compression refrigeration system, which has the Rankine cycle. However, the present invention is not limited to this.

In the fifth embodiment, the valve mechanism 411 is not limited to the arrangement depicted in the fifth embodiment. For example, the valve mechanism 411 can be a valve mechanism, which is operated based on an electrical signal.

Furthermore, it should be noted that the components of the integrated compressor/expander apparatus 10 can be combined in any appropriate manner among the first to fifth embodiments.

Additional advantages and modifications will readily occur to those skilled in the art. The invention in its broader terms is therefore not limited to the specific details, representative apparatus, and illustrative examples shown and described.

What is claimed is:

1. A fluid machine, which is operable in a pump mode for pressurizing fluid and discharging the pressurized fluid from the fluid machine and is also operable in a motor mode for converting fluid pressure of fluid into kinetic energy and thereafter outputting the kinetic energy as mechanical energy, the fluid machine comprising:

a housing;

at least one movable member that is received in the housing, wherein each movable member defines a working chamber having a variable volume in the housing; and a valve mechanism that opens and closes at least one communication passage arranged in the housing, wherein each communication passage communicates between the corresponding working chamber and a high pressure chamber, wherein:

the valve mechanism enables flow of fluid from each working chamber to the high pressure chamber and blocks backflow of fluid from the high pressure chamber to each working chamber at time of operation of the fluid machine in the pump mode;

the valve mechanism opens at least one of the at least one communication passage at time of operation of the fluid machine in the motor mode;

the at least one movable member is drivable by an external drive force to change the volume of the corresponding working chamber and thereby to compress the fluid in the corresponding working chamber in the pump mode; and the at least one movable member is drivable by an expansion energy of the fluid, which is supplied into and is expanded in the corresponding working chamber to change the volume of the corresponding working chamber, so that the kinetic energy is generated in the motor mode.

2. The fluid machine according to claim 1, wherein:

the at least one communication passage includes:

a first communication passage, which conducts fluid at the time of operation of the fluid machine in the pump mode; and a second communication passage, which conducts fluid at the time of operation of the fluid machine in the motor mode; and the valve mechanism includes:

a check valve, which opens and closes the first communication passage; and an electric switching valve, which opens and closes the second communication passage.

3. The fluid machine according to claim 2, wherein the switching valve is a switching valve of a direct type, which includes a valve body and directly displaces the valve body of the switching valve to open and close the second communication passage.

4. The fluid machine according to claim 2, wherein the switching valve is a switching valve of a pilot type, which includes a valve body and indirectly displaces the valve body of the switching valve to open and close the second communication passage by controlling a back pressure applied to the valve body.

5. The fluid machine according to claim 1, wherein the valve mechanism includes:
   a valve body, which is arranged in the high pressure chamber and opens and closes the at least one of the at least one communication passage; and
   an actuator, which forcefully displaces the valve body relative to the at least one of the at least one communication passage.

6. The fluid machine according to claim 1, further comprising a dynamo-electric machine that rotates in response to displacement of the movable member.

7. The fluid machine according to claim 6, wherein the dynamo-electric machine is located in the housing.

8. The fluid machine according to claim 1, further comprising a drive force transmission mechanism, which transmits drive force of a drive source to the movable member in a manner that selectively enables and disables transmission of the drive force from the drive source to the movable member.

9. The fluid machine according to claim 8, wherein a rotational axis of the drive force transmission mechanism is coaxial with a rotational axis of the movable member.

10. The fluid machine according to claim 1, wherein the movable member is a scroll.

11. The fluid machine according to claim 1, wherein:
    each movable member is a piston, which increases and decreases the volume of the corresponding working chamber upon reciprocal movement of the piston;
    in the pump mode, the valve mechanism communicates between a low pressure part located in the housing and the corresponding working chamber to supply fluid from the low pressure part to the corresponding working chamber while blocking backflow of fluid from the corresponding working chamber to the low pressure part and thereafter communicates between the corresponding working chamber to the high pressure chamber to supply fluid from the corresponding working chamber to the high pressure chamber while preventing backflow of fluid from the high pressure chamber to the corresponding working chamber; and
    in the motor mode, the valve mechanism communicates between the high pressure chamber to the corresponding working chamber to supply fluid from the high pressure chamber to the corresponding working chamber while preventing backflow of fluid from the corresponding working chamber to the high pressure chamber and thereafter communicates between the corresponding working chamber and the low pressure part to supply fluid from the corresponding working chamber to the low pressure part while preventing backflow of fluid from the low pressure part to the corresponding working chamber.

12. The fluid machine according to claim 11, wherein the valve mechanism includes a valve body that is driven in synchronism with the reciprocal movement of each piston.

13. The fluid machine according to claim 11, further comprising a shaft, which is rotated in synchronism with the reciprocal movement of each piston through a converting mechanism, which converts rotational movement of the shaft into reciprocal movement of each piston, wherein the valve mechanism includes a valve body, which is connected to the shaft to rotate integrally therewith and is driven in synchronism with the reciprocal movement of each piston when the valve body is rotated by the shaft.

14. The fluid machine according to claim 13, wherein:
    the valve body controls a communicational state between the low pressure part and the corresponding working chamber in the pump mode; and
    the valve body controls a communicational state between the low pressure part and the corresponding working chamber and also controls a communicational state between the high pressure chamber and the corresponding working chamber in the motor mode.

15. The fluid machine according to claim 13, wherein the valve mechanism includes an actuator, which switches control operation of the fluid machine between the pump mode and the motor mode by displacing the valve body in a direction parallel to an axial direction of the shaft.

16. The fluid machine according to claim 14, wherein the valve mechanism further includes at least one check valve, which blocks flow of fluid from the high pressure chamber into the corresponding working chamber.

17. The fluid machine according to claim 13, further comprising a dynamo-electric machine, which has a rotor securely connected to the shaft.

18. The fluid machine according to claim 13, further comprising a drive force transmission arrangement, which transmits drive force of an external drive source to the shaft.

19. The fluid machine according to claim 18, wherein the drive force transmission arrangement is a clutch that selectively enables and disables transmission of the drive force of the external drive source to the shaft.

20. The fluid machine according to claim 19, wherein:
    the dynamo-electro machine generates electric power in the motor mode; and
    fluid is compressed and is discharged by the fluid machine through use of drive force supplied from at least one of the dynamo-electric machine and the external drive source in the pump mode.

21. The fluid machine according to claim 1, further comprising:
    a capacity variable mechanism that varies a capacity of each working chamber to vary a volume of fluid, which is expandable in the corresponding working chamber at the time of operation in the motor mode; and
    a control apparatus that controls the capacity variable mechanism to vary the capacity.

22. The fluid machine according to claim 21, wherein an increase or decrease in a flow rate of fluid supplied to the fluid machine is proportional to an increase or decrease in the capacity in the motor mode.

23. The fluid machine according to claim 21, wherein the control apparatus controls the capacity variable mechanism in such a manner that the capacity variable mechanism also varies a volume of refrigerant discharged from the working chamber in the pump mode.

24. The fluid machine according to claim 21, wherein:
    each movable member is driven to slide by a rotating drive shaft; and
    the drive shaft is connected to one of a dynamo and an external drive source at the time of operation in the motor mode.

25. The fluid machine according to claim 21, wherein:
    each movable member is driven to slide by a rotating drive shaft; and the drive shaft is connected to one of an external drive source and a motor in the pump mode.

26. A waste heat recovering system that recovers energy from heated vapor, which is heated by waste heat, the waste heat recovering system comprising a fluid machine, which is operable in a pump mode for pressurizing fluid and discharging the pressurized fluid from the fluid machine and is also operable in a motor mode for converting fluid pressure of fluid into kinetic energy and thereafter outputting the kinetic energy as mechanical energy, wherein the fluid machine includes:

a housing;

at least one movable member that is received in the housing, wherein each movable member defines a working chamber having a variable volume in the housing; and a valve mechanism that opens and closes at least one communication passage arranged in the housing, wherein each communication passage communicates between the corresponding working chamber and a high pressure chamber, wherein:

the valve mechanism enables flow of fluid from each working chamber to the high pressure chamber and blocks backflow of fluid from the high pressure chamber to each working chamber at time of operation of the fluid machine in the pump mode;

the valve mechanism opens at least one of the at least one communication passage at time of operation of the fluid machine in the motor mode;

the at least one movable member is drivable by an external drive force to change the volume of the corresponding working chamber and thereby to compress the fluid in the corresponding working chamber in the pump mode; and the at least one movable member is drivable by an expansion energy of the fluid, which is supplied into and is expanded in the corresponding working chamber to change the volume of the corresponding working chamber, so that the kinetic energy is generated in the motor mode.

* * * * *